United States Patent
Kitamura (10) Patent No.: US 8,526,690 B2
(45) Date of Patent: Sep. 3, 2013

(54) AUTOMATIC DETECTION OF TARGET TISSUES FORMED BY LINEAR STRUCTURES FROM WITHIN THREE DIMENSIONAL IMAGES

(75) Inventor: Yoshiro Kitamura, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 161 days.

(21) Appl. No.: 12/737,623

(22) PCT Filed: Feb. 23, 2010

(86) PCT No.: PCT/JP2010/001191
§ 371 (c)(1),
(2), (4) Date: Jan. 31, 2011

(87) PCT Pub. No.: WO2010/100858
PCT Pub. Date: Sep. 10, 2010

(65) Prior Publication Data
US 2011/0135172 A1    Jun. 9, 2011

(30) Foreign Application Priority Data

Mar. 3, 2009  (JP) ................................ 2009-048679
Mar. 23, 2009  (JP) ................................ 2009-069895

(51) Int. Cl.
*G06K 9/00* (2006.01)

(52) U.S. Cl.
USPC ........................................................ 382/128

(58) Field of Classification Search
USPC ..... 382/128–134; 128/920–925; 356/39–49; 600/407–414, 424–426; 345/581–618
See application file for complete search history.

(56) References Cited

U.S. PATENT DOCUMENTS

| 7,346,209 B2 | 3/2008 | Gokturk et al. |
| 2007/0269086 A1 * | 11/2007 | Kerwin et al. ................ 382/128 |
| 2008/0044080 A1 | 2/2008 | Li |
| 2009/0097730 A1 | 4/2009 | Kasai et al. |

FOREIGN PATENT DOCUMENTS

| JP | 2004-230086 | 8/2004 |
| JP | 2006-346094 | 12/2006 |
| JP | 2007-307358 | 11/2007 |

OTHER PUBLICATIONS

Aylward, S., Bullitt, E., 2002. Initialization, noise, singularities, and scale in height ridge traversal for tubular object centerline extraction. IEEE Transactions on Medical Imaging 21 (2), 61-75.*
A. Szymczak et al. "Coronary vessel trees from 3D imagery: A topographical approach", Medical Image Analysis, vol. 10, Issue 4, pp. 548-559, 2006.
H. Shitaka et al. "An algorith for extracting pulmonary vascular trees from 3D X-ray CT . . . ", IEICE Technical Report, Jan. 15, 2005, vol. 104, No. 580, pp. 31-36.

(Continued)

*Primary Examiner* — Atiba O Fitzpatrick
(74) *Attorney, Agent, or Firm* — Jean C. Edwards, Esq.; Edwards Neils PLLC (57) ABSTRACT

[Objective] To improve detection performance of target tissues formed by linear structures within three dimensional images.
[Constitution] The directions of principal axes of target tissues formed by linear structures or the directions of lines normal to tissues formed by planar structures within detection regions are calculated. Normalization processes are administered with respect to candidate target regions that include candidate target tissues based on the directions of the principal axes or the directions of the normal lines. Features of the normalized candidate target regions are calculated, and judgments are performed regarding whether the target tissues are included in the candidate target regions, employing the calculated features.

15 Claims, 10 Drawing Sheets

(56) References Cited

OTHER PUBLICATIONS

Jinghao Zhou et al, "Vascular Structure Segmentation and Bifurcation Detection", Biomedical Imaging: From Nano to Macro, Apr. 1, 2007, pp. 872-875, ISBI 2007.

S. R. Aylward, "Initialization, Noise, Singularities, and Scale in Height Ridge Traversal . . ." IEEE Transactions on Medical Imaging, vol. 21, No. 2, Feb. 2002, pp. 61-75.

* cited by examiner

THREE PERPENDICULARLY INTERSECTING SECTIONAL IMAGES

FIG.17B

THREE PERPENDICULARLY INTERSECTING SECTIONAL IMAGES

US 8,526,690 B2

AUTOMATIC DETECTION OF TARGET TISSUES FORMED BY LINEAR STRUCTURES FROM WITHIN THREE DIMENSIONAL IMAGES

CROSS-REFERENCE TO RELATED APPLICATIONS

The present invention is a 35 U.S.C. 371 National Stage Entry of PCT/JP2010/001191, filed Feb. 23, 2010, which claims priority from Japanese Patent Application Nos. 2009-048679, filed on Mar. 3, 2009 and 2009-069895, filed on Mar. 23, 2009, the contents of all of which are herein incorporated by reference in their entirety.

TECHNICAL FIELD

The present invention is related to detecting processes to be administered within three dimensional images. Particularly, the present invention is related to an image processing apparatus, an image processing method, and an image processing program suited for automatic detection of target tissues formed by linear structures from within three dimensional images.

BACKGROUND ART

Conventionally, pseudo three dimensional images that represent target tissues are generated in the medical field. The pseudo three dimensional images are generated by detecting the target issues from within a plurality of two dimensional images by administering a predetermined detecting process (a detecting method that employs machine learning, for example). The target tissues detected within the plurality of two dimensional images are rendered into the pseudo three dimensional images by causing a computer to execute an image projection method (the Intensity Projection Method) or by the volume rendering method, which enable three dimensional images to be constructed. Thereby, radiologists can easily confirm the states of the target tissues.

A method, in which three sectional images that perpendicularly intersect each other are generated from a three dimensional image and a target tissue is detected based on features extracted from the three sectional images, is proposed in Patent Document 1.

A method, in which a target tissue is detected within a two dimensional image by machine learning, is proposed in Patent Document 2.

A method, in which target tissues formed by linear structures (blood vessels, for example) are detected within regions of interest by administering a differential filtering process onto each two dimensional image (CT image) that constitutes a three dimensional image, and detecting the positions within the CT images at which pixel values change, is proposed in Non Patent Document 1.

PRIOR ART DOCUMENTS

Patent Documents

Patent Document 1:
U.S. Pat. No. 7,346,209
Patent Document 2:
Japanese Unexamined Patent Publication No. 2007-307358

Non Patent Documents

Andrzej Szymczak et al., "Coronary Vessel Trees from 3D Imagery: A Topological Approach", Medical Image Analysis, Vol. 10, Issue 4, pp. 548-559, 2006

SUMMARY OF THE INVENTION

Problem to be Solved by the Invention

Figure 17A:
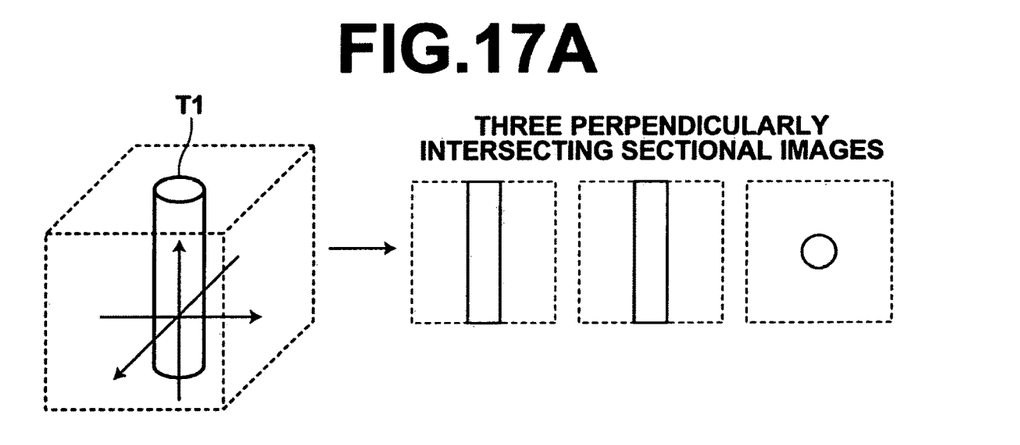
FIG. 17A is a first conceptual diagram for explaining prior art
Figure 17B:
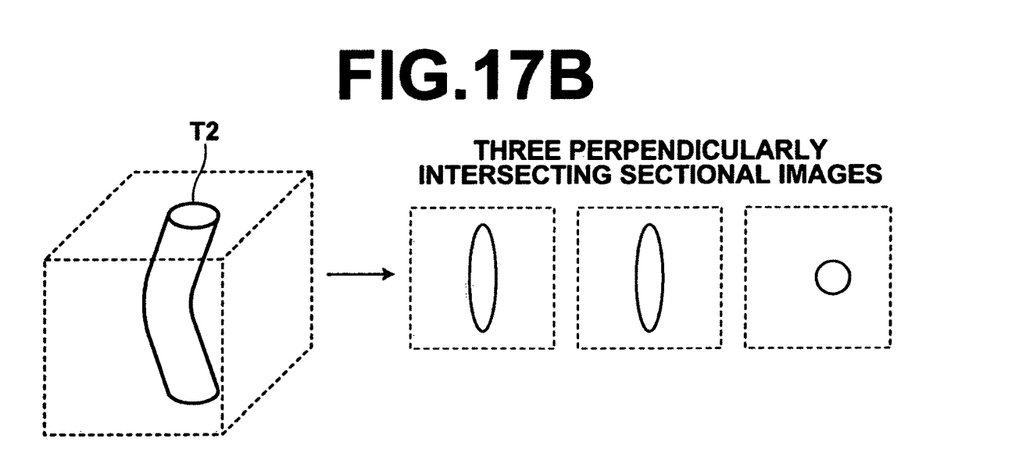
FIG. 17B is a second conceptual diagram for explaining prior art

The invention disclosed in Patent Document 1 sets three sectional images that perpendicularly intersect each other from the target tissue as detection target images. If this method is applied with respect to linear structures, for example, sets of three sectional images such as those illustrated in FIG. 17A and FIG. 17B are obtained. According to the invention disclosed in Patent Document 1, the three perpendicularly intersecting axes are randomly changed to set the sectional images, and the detecting process is administered a plurality of times. Thereby, the total amount of data to be employed in calculations is decreased when detecting the target tissue.

However, in the case that the linear structure is of a curved shape such as that illustrated in FIG. 17B, there is a problem that data regarding the target tissue will be greatly lacking within the sectional images.

There is a known method that utilizes Hessian matrices to extract linear structures and planar structures, which is used to extract blood vessels, etc. However, although analyzing eigenvalues of Hessian matrices would enable judgment of blood vessels formed by ideally linear structures, it is difficult to judge blood vessels which are of curved shapes, branched shapes, or have diseased portions. Similarly, planar structures within human bodies are not limited to those of ideally plane shapes. Therefore, it is difficult to correctly judge such planar structures as well.

In view of the foregoing circumstances, the first objective of the present invention is to provide an image processing apparatus, an image processing Method, and an image processing program that enables improvement of detection performing even when linear structures or planar structures are curved, branched, or diseased.

Figure 2:
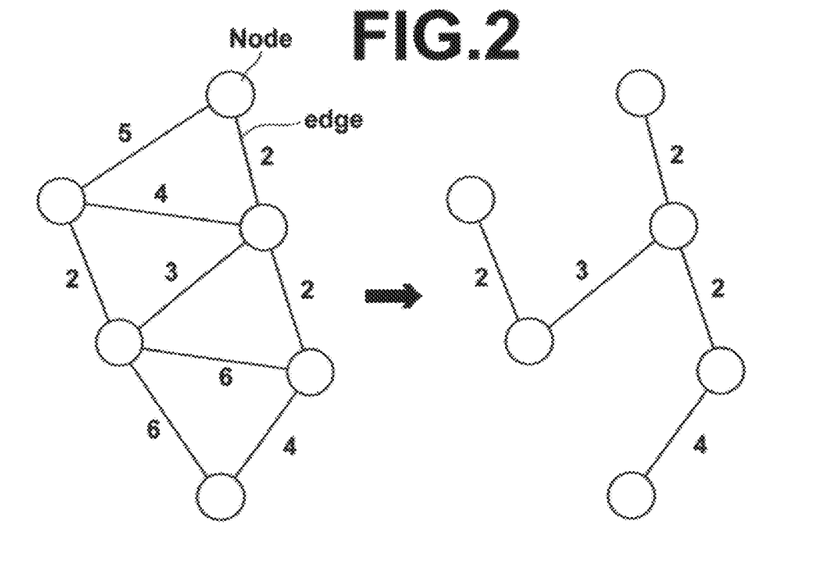
FIG. 2 A diagram for explaining the minimum spanning tree technique
Figure 3A:
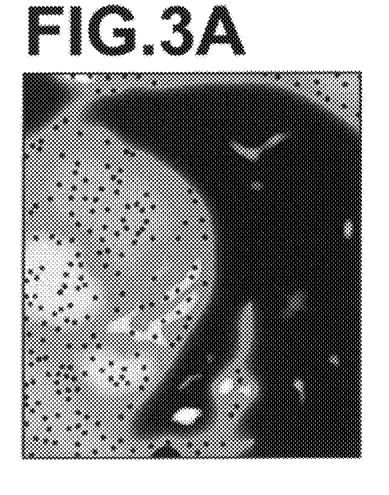
FIG. 3A A diagram that illustrates examples of candidate points and connections of tree structures, for explaining Non Patent Document 1 (examples of detected candidate points)
Figure 3B:
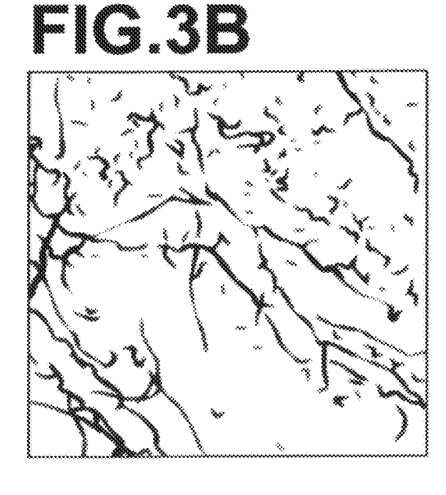
FIG. 3B A diagram that illustrates examples of candidate points and connections of tree structures, for explaining Non Patent Document 1 (tree structures)

The invention disclosed in Non Patent Document 1 sets weighting lower for candidate points (nodes) which are close to each other, and reconstructs tree structures by the minimum spanning tree technique. If this method is applied to blood vessels, for example, combinations of edges that connect all nodes at minimum costs is obtained, in the case that nodes, which are candidate points, and edge data (the numerical values indicated in FIG. 2 are edge data values) that correspond to weighting for connecting the nodes are provided as illustrated in FIG. 2. Blood vessels are detected by setting a plurality of candidate points within an image as illustrated in FIG. 3A, and by connecting the candidate points by the minimum spanning tree technique to reconstruct a tree structure.

However, the method of Non Patent Document 1 has a tendency to simply connect candidate points (nodes) which are close to each other. Therefore, there is a problem that the paths of blood vessels cannot be correctly detected in cases that candidate points, which are noise, are included.

In view of the foregoing circumstances, it is a second objective of the present invention to provide an image processing apparatus, an image processing method, and an image processing program capable of generating tree structures that more accurately reflect correct linear structures, by reducing erroneous connections in cases that a target tissue is formed by linear structures.

Means for Solving the Problem

A first image processing apparatus of the present invention is characterized by comprising:

a detection region setting section, for setting detection regions within three dimensional images obtained by imaging subjects;

a principal axis/normal line direction calculating section, for calculating the directions of the principal axes of candidate target tissues formed by linear structures within the detection regions or the directions of lines normal to candidate target tissues formed by planar structures within the detection regions;

a normalization processing section, for administering normalizing processes onto candidate target regions that include the candidate target tissues based on the directions of the principal axes or the directions of the normal lines; and a judging section, for calculating features of the normalized candidate target regions, and for judging whether target tissues are included in the candidate target regions using the calculated features. The "image processing apparatus" may include an imaging device for generating the three dimensional images.

The "principal axis/normal line direction calculating section" calculates the directions of the principal axes of candidate target tissues which are formed by linear structures, or the directions of lines normal to candidate target tissues which are formed by planar structures. The directions of the principal axes or the directions of the normal lines may be calculated by calculating Hessian matrices with respect to the detection regions, and by analyzing eigenvalues of the calculated Hessian matrices, for example.

Further, the "principal axis/normal line direction calculating section" may judge whether the candidate target tissues are formed by linear structures or formed by planar structures, based on whether the eigenvalues satisfy predetermined threshold value conditions.

The "detection regions" refer to predetermined regions within the three dimensional images obtained by imaging subjects that include target regions. In the case that coronary arteries are to be extracted as target tissues, the "detection regions" may be regions that include the cardiac region or portions of the cardiac region.

In the first image processing apparatus of the present invention, the judging section may be equipped with normalized data based on the directions of principal axes or normal lines of target tissues of the same types as the target tissues from three dimensional images that include the same types of target tissues which are prepared in advance as teacher data; and may judge whether the candidate target regions include the target tissues by analyzing the calculated features, utilizing a machine learning method using the teacher data.

During learning of classifiers for discriminating coronary arteries, data that represent curved portions, branching portions, and diseased portions such as stenosis, calcifications, and stent locations, are employed as positive teacher data, in addition to linear portions of coronary arteries. By performing learning including such data in the teacher data, judgments will be capable of handling variations in the coronary arteries, and diseased portions will be capable of being discriminated as blood vessels with high accuracy. Data representing random portions other than coronary arteries may be prepared as negative teacher data.

A first image processing method of the present invention is characterized by comprising:

setting detection regions within three dimensional images obtained by imaging subjects;

calculating the directions of the principal axes of candidate target tissues formed by linear structures within the detection regions or the directions of lines normal to candidate target tissues formed by planar structures within the detection regions;

administering normalizing processes onto candidate target regions that include the candidate target tissues based on the directions of the principal axes or the directions of the normal lines;

calculating features of the normalized candidate target regions; and judging whether target tissues are included in the candidate target regions using the calculated features.

A first image processing program of the present invention is characterized by causing a computer to realize the functions of:

setting detection regions within three dimensional images obtained by imaging subjects;

calculating the directions of the principal axes of candidate target tissues formed by linear structures within the detection regions or the directions of lines normal to candidate target tissues formed by planar structures within the detection regions;

administering normalizing processes onto candidate target regions that include the candidate target tissues based on the directions of the principal axes or the directions of the normal lines;

calculating features of the normalized candidate target regions; and judging whether target tissues are included in the candidate target regions using the calculated features.

A second image processing apparatus of the present invention is characterized by comprising:

a candidate point calculating section, for calculating positional information and the directions of the principal axes for a plurality of candidate points that represent target tissues formed by linear structures, by administering a predetermined detecting process on three dimensional images obtained by imaging subjects; and a reconstruction processing section, for performing reconstruction such that the plurality of candidate points are connected, using a cost function that employs variables based on the calculated positional information and the directions of the principal axes.

The "candidate point calculating section" calculates positional information and the directions of the principal axes for a plurality of candidate points that represent target tissues formed by linear structures, by administering a predetermined detecting process on the three dimensional images.

The "candidate point calculating section" may calculate the positional information and the directions of the principal axes of each of the plurality of candidate points by calculating Hessian matrices with respect to the detection regions, and by analyzing eigenvalues of the calculated Hessian matrices.

In addition, the "the candidate point calculating section" may detect the candidate points, based on whether the eigenvalues satisfy predetermined threshold value conditions.

The "candidate point calculating section" may be equipped with:

a normalization processing section, for administering normalizing processes onto candidate target regions that include the candidate target tissues based on the directions of the principal axes; and a judging section, for calculating features of the normalized candidate target regions, and for judging whether target tissues are included in the candidate target regions using the calculated features.

The judging section may be equipped with normalized data based on the directions of principal axes of target tissues of the same types as the target tissues from three dimensional images that include the same types of target tissues which are prepared in advance as teacher data; and may judge whether the candidate target regions include true target tissues by analyzing the calculated features, utilizing a machine learning method using the teacher data.

The "reconstruction processing section" performs reconstruction such that the plurality of candidate points are connected, using a cost function that employs variables based on the calculated positional information and the directions of the principal axes. The "reconstruction processing section" may perform reconstruction employing a cost function which has as conditions that the relationship between at least two of the candidate points from among the plurality of candidate points is such that they are within a predetermined distance from each other, based on the positional information of each of the two candidate points, and that the sum of two acute angles determined by a basic line that connects the two candidate points and the directions of the principal axes of each of the two candidate points is less than a predetermined angle.

The reconstruction processing section may perform reconstruction using the minimum spanning tree technique, for example. In addition, the reconstruction processing section may use a cost function that employs the intensity values of two candidate points as variables.

The "three dimensional images" are images constituted by voxel data. The "three dimensional images" are three dimensional images constituted by a plurality of two dimensional images. Examples of types of two dimensional images include: radiation images, CT images, MRI images, RI images, and PET images.

The "target tissues" refer to tissues formed by linear structures at predetermined portions of the subjects represented by the three dimensional images. Examples of tissues formed by linear structures include: coronary arteries, cerebral blood vessels, hepatic blood vessels, bronchial tubes, and pulmonary blood vessels.

A second image processing method of the present invention is characterized by comprising:

calculating positional information and the directions of the principal axes for a plurality of candidate points that represent target tissues formed by linear structures, by administering a predetermined detecting process on three dimensional images obtained by imaging subjects; and performing a reconstruction process such that the plurality of candidate points are connected, using a cost function that employs variables based on the calculated positional information and the directions of the principal axes.

A second image processing program of the present invention is characterized by causing a computer to realize the functions of:

calculating positional information and the directions of the principal axes for a plurality of candidate points that represent target tissues formed by linear structures, by administering a predetermined detecting process on three dimensional images obtained by imaging subjects; and performing a reconstruction process such that the plurality of candidate points are connected, using a cost function that employs variables based on the calculated positional information and the directions of the principal axes.

Advantageous Effects of the Invention

The first image processing apparatus, the first image processing method, and the first image processing program of the present invention calculate the directions of the principal axes of candidate target tissues formed by linear structures within the detection regions or the directions of lines normal to candidate target tissues formed by planar structures within the detection regions; administer normalizing processes onto candidate target regions that include the candidate target tissues based on the directions of the principal axes or the directions of the normal lines; calculate features of the normalized candidate target regions; and judge whether target tissues are included in the candidate target regions using the calculated features. Therefore, stable detection is enabled, even if the outer appearances of target tissues formed by linear structures are varied due to curvature, branching, or disease.

The second image processing apparatus, the second image processing method, and the second image processing program of the present invention calculate positional information and the directions of the principal axes for a plurality of candidate points that represent target tissues formed by linear structures, by administering a predetermined detecting process on three dimensional images obtained by imaging subjects; and perform a reconstruction process such that the plurality of candidate points are connected, using a cost function that employs variables based on the calculated positional information and the directions of the principal axes. Therefore, target tissues can be correctly detected without erroneous connections being generated, even if candidate points which are noise are present within the three dimensional images.

BEST MODE FOR CARRYING OUT THE INVENTION

Hereinafter, an embodiment of an image processing apparatus of the present invention will be described with reference to the attached drawings.

Figure 1:
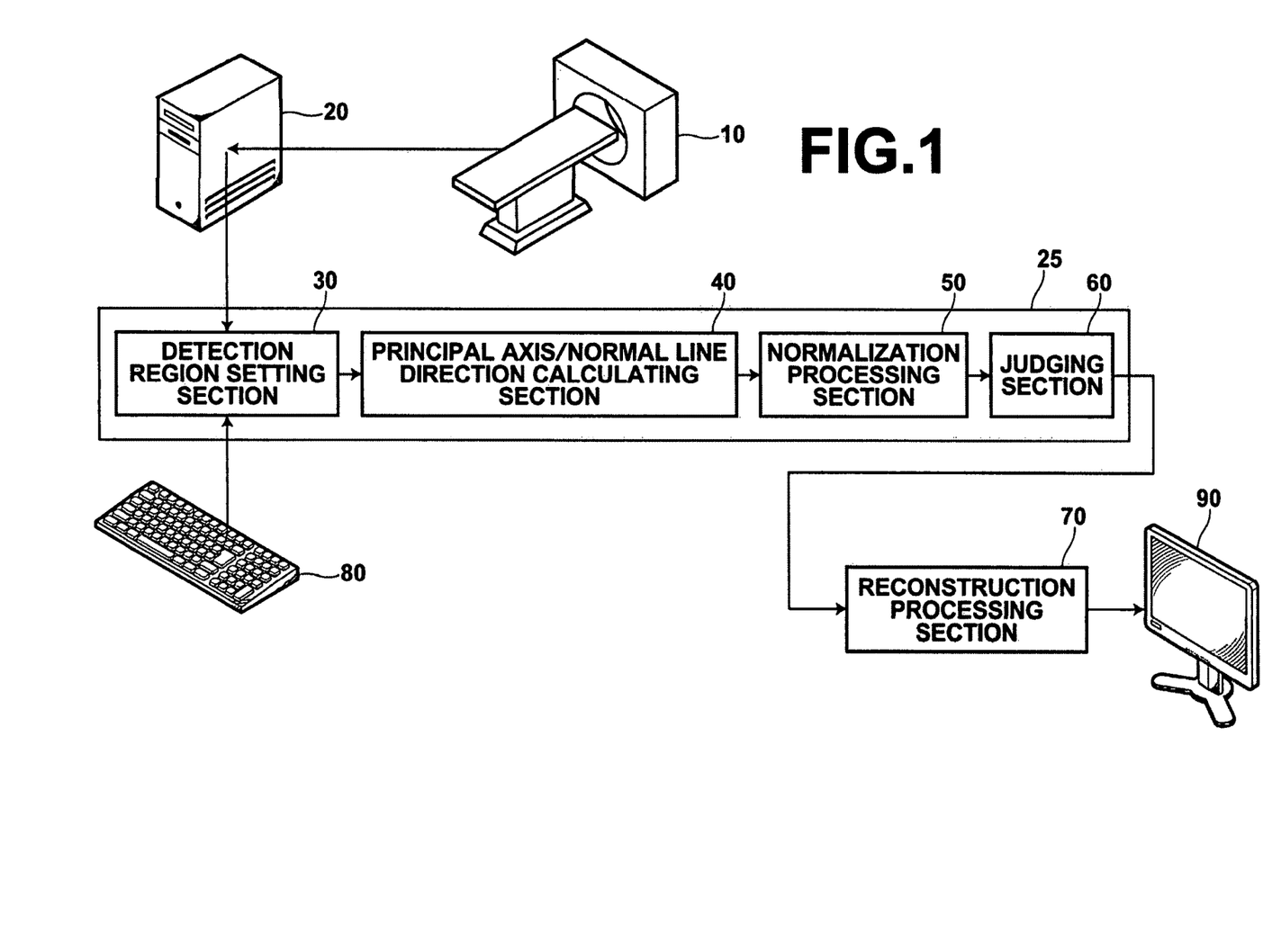
FIG. 1 A functional block diagram of an image processing apparatus

FIG. 1 is a block diagram that illustrates an image processing apparatus according to a preferred embodiment of the present invention.

Note that the configuration of the image processing apparatus illustrated in FIG. 1 is realized by executing a program, which is read into an auxiliary memory device (not shown), on a computer (a personal computer, for example). The program is recorded in a data recording medium such as a CD-ROM, or distributed via a network such as the Internet, and installed in the computer.

The image processing apparatus automatically detects target tissues represented by three dimensional images, which are constituted by a plurality of two dimensional images such as those imaged by an X ray CT apparatus 10. The image processing apparatus includes: a candidate point calculating section 25, and a reconstruction processing section 70.

An image obtaining section 20, an input section 80, and a display section 90 are connected to the image processing apparatus.

The image obtaining section 20 obtains CT images (two dimensional images) imaged by an imaging apparatus such as the X ray CT apparatus 10 illustrated in FIG. 1. Note that the image obtaining means 20 is not limited to obtaining CT apparatuses, but may obtain other types of two dimensional images, such as MRI images, RI images, PET images, and X ray images. In addition, the image obtaining section 20 obtains three dimensional images constituted by a plurality of such two dimensional images.

The input section 80 includes a keyboard, a mouse, etc.

The image processing apparatus of the present invention is constituted by: a candidate point calculating section 25, for calculating positional information and the directions of the principal axes for a plurality of candidate points that represent target tissues formed by linear structures, by administering a predetermined detecting process on three dimensional images obtained by imaging subjects; and a reconstruction processing section 70, for performing reconstruction such that the plurality of candidate points are connected, using a cost function that employs variables based on the calculated positional information and the directions of the principal axes.

The candidate point calculating section 25 is constituted by: a detection region setting section 30; a principal axis/normal line direction calculating section 40 (hereinafter, also referred to as "principal axis direction calculating section 40" and "principal axis calculating section 40"); a normalization processing section 50; and a judging section 60.

The candidate point calculating section 25 calculates positional information and the directions of the principal axes for a plurality of candidate points that represent target tissues formed by linear structures, by administering a predetermined detecting process on the three dimensional images.

The candidate point calculating section 25 calculates the positional information and the directions of the principal axes of each of the plurality of candidate points by calculating Hessian matrices with respect to the detection regions, and by analyzing eigenvalues of the calculated Hessian matrices. Further, the candidate point calculating section 25 may detect the candidate points, based on whether the eigenvalues satisfy predetermined threshold value conditions.

The candidate point calculating section is equipped with: the detection region setting section 30, for setting detection regions within the three dimensional images obtained by the image obtaining section 20; the principal axis direction calculating section 40, for calculating the directions of the principal axis of target tissues formed by linear structures within the detection regions; the normalization processing section 50, for administering normalizing processes onto candidate target regions that include the candidate target tissues based on the directions of the principal axes; and the judging section 60, for calculating features of the normalized candidate target regions, and for judging whether target tissues are included in the candidate target regions using the calculated features.

The detection region setting section 30 sets detection regions within the three dimensional images obtained by the image obtaining section 20. The detection region setting section 30 sets the detection regions by executing detection algorithms. Examples of detection algorithms which are executed by the detection region setting section 30 include: threshold value processes, and segment division processes. An example of a detection region is the heart.

In addition, the detection region setting section 30 may set regions input by the input section 80 as the detection regions.

The principal axis/normal line direction calculating section 40 calculates the directions of the principal axes of candidate target tissues formed by linear structures within the detection regions. The principal axis/normal line direction calculating section 40 calculates the directions of the of the principal axes of candidate target tissues formed by linear structures or the directions of lines normal to candidate target tissues formed by planar structures within the detection regions set by the detection region setting section 30. The principal axis/normal line direction calculating section 40 calculates the directions of the principal axes or the directions of the normal lines by calculating Hessian matrices with respect to the detection regions, and by analyzing eigenvalues of the calculated Hessian matrices, for example. Further, the principal axis/normal line direction calculating section 40 judges whether the candidate target tissues are formed by linear structures or formed by planar structures, based on whether the eigenvalues satisfy predetermined threshold value conditions. Thereby, rough judgments regarding whether the candidate target tissues are linear structures or planar structures become possible. A configuration may be adopted, in which the judging section 60 performs more precise judgments regarding whether the candidate target tissues are linear structures or planar structures.

The normalization processing section 50 administers normalization processes onto target regions that include target tissues, based on the directions of the principal axes calculated by the principal axis calculating section 40.

The judging section 60 calculates features of the normalized target regions, and judges whether true target tissues are included in the target regions using the calculated features.

The judging section 60 may be equipped with normalized data based on the directions of principal axes or normal lines of target tissues of the same types as the target tissues from three dimensional images that include the same types of target tissues which are prepared in advance as teacher data; and may judge whether the candidate target regions include the target tissues by analyzing the calculated features, utilizing a machine learning method using the teacher data. During learning of classifiers for discriminating coronary arteries, data that represent curved portions, branching portions, and diseased portions such as stenosis, calcifications, and stent locations, are employed as positive teacher data, in addition to linear portions of coronary arteries. By performing learning including such data in the teacher data, judgments will be capable of handling variations in the coronary arteries, and diseased portions will be capable of being discriminated as blood vessels with high accuracy. Data representing random portions other than coronary arteries may be prepared as negative teacher data.

Specifically, a machine learning technique based on Adaboost, which is a technique for producing integrated learning machines, may be considered for use as a detecting method for target tissues. The judging section 60 uses a machine learning technique based on known techniques such as feature point detection and Adaboost, which successively updates weighting of learning data at each resampling step, and ultimately weights the produced machines, to produce integrated learning machines. In learning sample images, the central coordinates and the directions of the principal axes of target tissues or the radii, in cases that the target tissues are linear structures, are specified. Cubes, in which the target tissue are rotated in the directions of the principal axes thereof with the central coordinates as the centers of rotation, are designated as regions of interest. The scales of the cubes are standardized by the radii. Data that represent curved portions, branching portions, and diseased portions such as stenosis, calcifications, and stent locations, are included as positive learning samples for discriminating coronary arteries. Data representing random portions other than coronary arteries are prepared as negative teacher data.

Next, n combinations of the values of randomly selected pixel pairs are designated as features, and classifiers for discriminating positive and negative patterns are produced by a machine learning technique based on Adaboost. When detecting target tissues, the three dimensional images are scanned, cubic regions of various sizes having pixels of interest at the centers thereof are cut out, and features are calculated. The calculated features are input to the classifiers which are obtained in the learning step. Discrimination scores are obtained from the classifiers, and it is judged that a scanned portion represents the target tissues when the discrimination scores exceed a predetermined threshold value.

Primary differential values of CT values in the X, Y, Z, XY, YZ, and ZX directions within CT images are designated as the features for discrimination. Alternatively, the absolute values of CT values, histograms of CT values, secondary differential values, etc. may be employed as the features for discrimination.

Alternatively, various other statistical analysis methods and machine learning methods, such as the linear discrimination method, neural networks, support vector machines, etc., may be employed as the technique for detecting the target tissues.

The judging section 60 detects a plurality of positions of the target tissues from the three dimensional images by the aforementioned technique, and calculates a plurality of the candidate points.

Figure 4A:
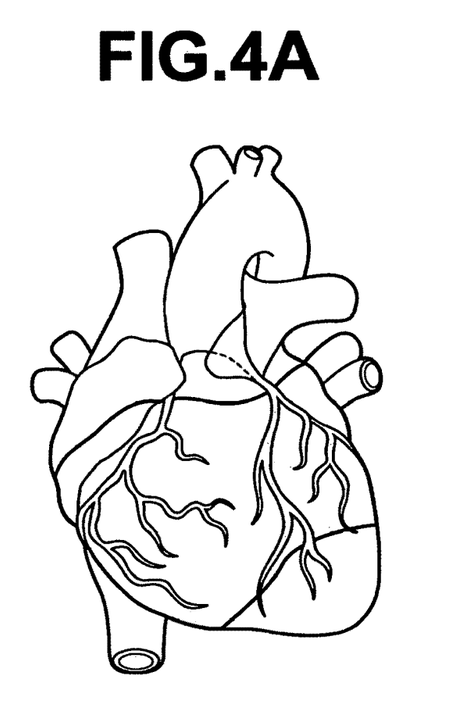
FIG. 4A A first diagram that illustrates a cardiac region generated by volume rendering FIG. 4B A second diagram that illustrates a cardiac region generated by volume rendering FIG. 5 A flow chart that illustrates the series of processes performed by an embodiment of the present invention FIG. 6 A conceptual diagram for explaining a Gaussian pyramid structure FIG. 7 A conceptual diagram for explaining how the direction of a principal axis of a linear structure is calculated FIG. 8 A conceptual diagram for explaining a normalizing process FIG. 9 A conceptual diagram for explaining a basic line that connects two candidate points (nodes) and the sum of two acute angles determined by the basic line the directions of the principal axes of each of the two candidate points FIG. 10 A graph for explaining a cost function (distance)
Figure 4B:
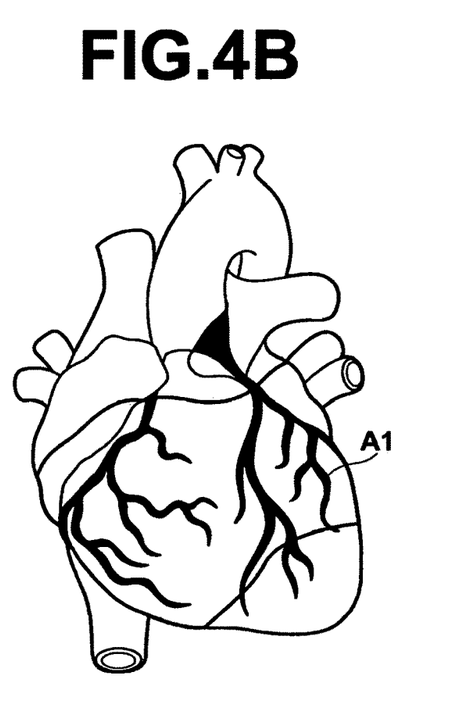

A display section 70, which is a monitor, a CRT screen, or the like that displays two dimensional images or three dimensional images is also provided. The entireties of the linear structures or planar structures can be viewed as a whole by volume rendering and displaying the regions judged to be the target tissues, and the continuities thereof can be observed. Radiologists can visually confirm the detection regions, by volume rendering and displaying the regions judged to be detection regions on the display section 70 as illustrated in FIG. 4A (the cardiac region in the example of FIG. 4A). In addition, radiologists can view the entireties of linear structures and visually confirm the continuities thereof, by volume rendering and displaying the target tissues (blood vessel A1) and the detection region (the cardiac region) on the display section 70, as illustrated in FIG. 4B.

Note that the judging section 60 calculates predetermined points within target regions that include cut out true target tissues as the candidate points.

The reconstruction processing section 70 performs reconstruction such that the plurality of candidate points are connected, using a cost function that employs variables based on the calculated positional information and the directions of the principal axes. In addition, the reconstruction processing section 70 performs reconstruction employing a cost function which has as conditions that the relationship between at least two of the candidate points from among the plurality of candidate points is such that they are within a predetermined distance from each other, based on the positional information of each of the two candidate points, and that the sum of two acute angles determined by a basic line that connects the two candidate points and the directions of the principal axes of each of the two candidate points is less than a predetermined angle. Specifically, the reconstruction processing section 70 may employ the minimum spanning tree technique to perform reconstruction. Alternatively, the reconstruction processing section 70 may employ a cost function that employs the intensity values of two candidate points as variables.

Next, the processes performed by the image processing apparatus having the configuration described above will be described.

Figure 5:
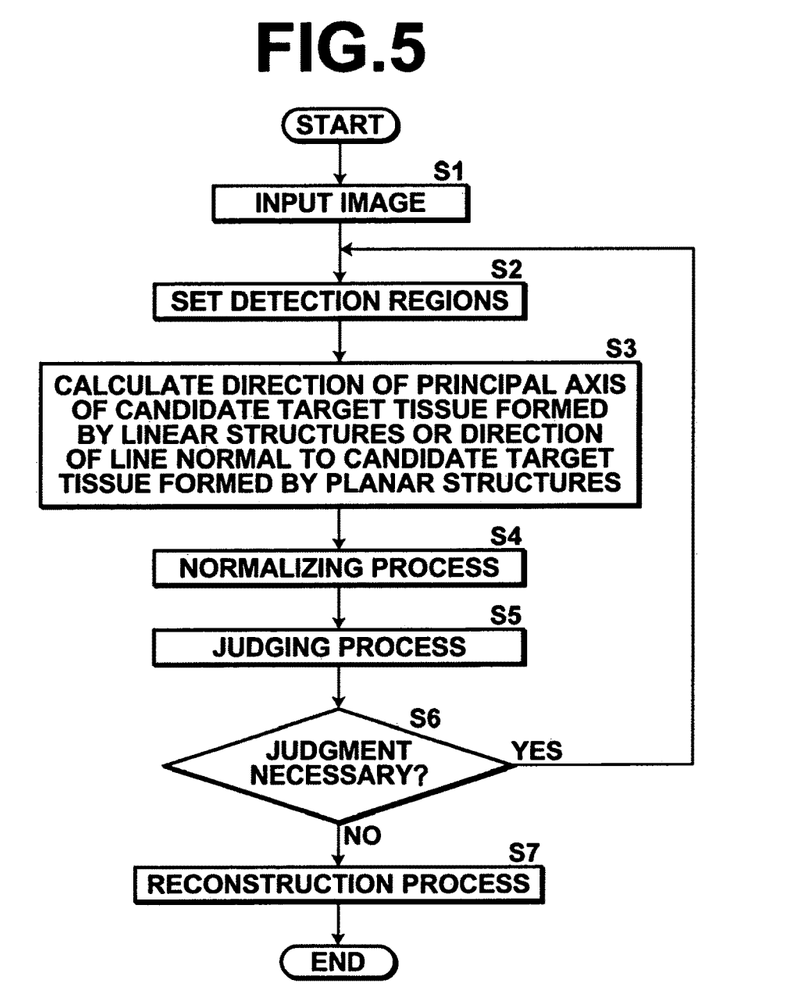

FIG. 5 is a flow chart that illustrates the series of processes performed by the image processing apparatus to detect target tissues formed by linear structures within a three dimensional image.

First, as illustrated in FIG. 5, a three dimensional image imaged by the X ray CT apparatus 10 is input to the image obtaining section 20 (step S1).

Next, the detection region setting section detects a cardiac region by executing the aforementioned detection algorithm. The detection region setting section 30 sets detection regions within the detected cardiac region (step S2). These detection regions are predetermined regions within the three dimensional image obtained by imaging a subject that includes the target region. The detection regions may be regions that include the cardiac region or portions of the cardiac region, for example.

The detection region setting section 30 converts the three dimensional image into multiple resolutions and generates Gaussian pyramids, in order to detect target tissues formed by linear structures within the detection regions.

Figure 6:
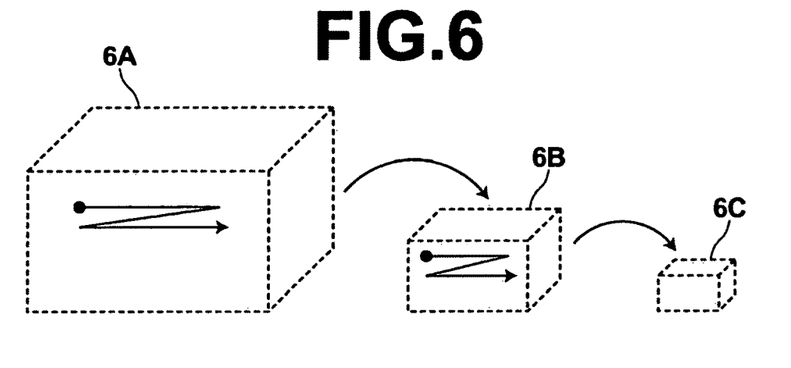
Figure 7:
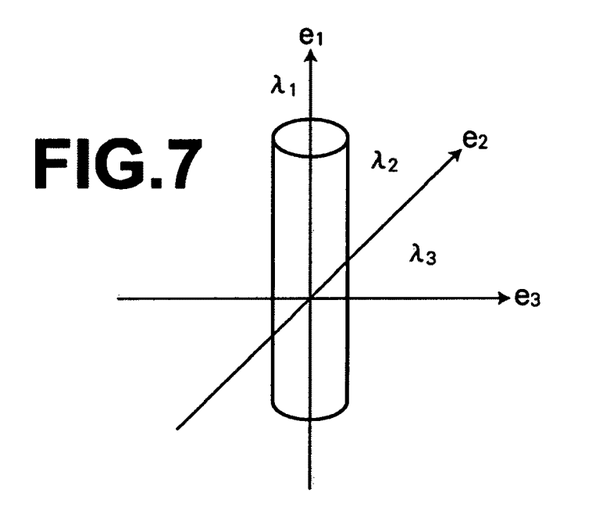

Thereafter, the detection region setting section 30 scans the detection algorithm for each generated Gaussian pyramid as illustrated in FIG. 6. Thereby, candidate target tissues (coronary arteries, for example) formed by linear structures of different sizes are detected.

The detection region setting section 30 sequentially performs scanning with respect to the detection region 6A, the detection region 6B, and the detection region 6C, which are of a Gaussian pyramid structure, and sets coordinates at which detection processes are to be executed. Target tissues (coronary arteries, for example) of different sizes can be detected, by sequentially scanning images having multiple resolutions.

Next, the principal axis direction calculating section 40 calculates the directions of the principle axes of target tissues (coronary arteries, for example) within local regions having the detection coordinates at their centers (step S3).

The principal axis direction calculating section 40 analyzes eigenvalues of Hessian matrices within regions that include candidate target tissues, to calculate the directions of the principal axes. Hessian matrices are matrices that have two tiered partial differential coefficients as elements. In three dimensional images, they become 3×3 matrices as exemplified in Formula (1).

$$\nabla^2 I = \begin{bmatrix} I_{xx} & I_{xy} & I_{xz} \\ I_{yx} & I_{yy} & I_{yz} \\ I_{zx} & I_{zy} & I_{zz} \end{bmatrix} \quad I_{xx} = \frac{\delta^2 I}{\delta x^2}, \quad I_{xy} = \frac{\delta^2 I}{\delta x \delta y^2}, \ldots \quad \text{[Formula 1]}$$

$$f = \exp\left(-\frac{x^2 + y^2 + z^2}{2\sigma^2}\right) \quad \text{[Formula 2]}$$

$$\frac{\delta^2 f}{\delta x^2} = \left(\frac{x^2}{\sigma^4} - \frac{1}{\sigma^2}\right)$$

$$\frac{\delta^2 f}{\delta x \delta y} = \left(\frac{xy}{\sigma^4}\right) \times f$$

In the case that Gaussian kernel (f) functions are employed, filter coefficients for obtaining the Hessian matrices are derived by Formula (2). The value of σ is designated to correspond to the sizes of linear structures to be detected.

When eigenvalue decomposition is performed on the Hessian matrix and eigenvalues and eigenvectors are obtained, the eigenvector corresponding to the eigenvalue closest to 0 represents the direction of the principal axis.

Linear structures are known to be characterized by having two large eigenvalues and one eigenvalue close to 0. Therefore, it is effective to judge the likelihood of candidates being linear structures from the eigenvalues, and then to perform more detailed judgments with respect to the remaining candidates. In addition, planar structures are known to be characterized by having one eigenvalue with a large absolute value, and two eigenvalues close to 0. The eigenvalues of Formula (1) will have the relationship of Formula (3) for target tissues formed by linear structures.

$$\text{Eigenvalues of } \nabla^2 I: \lambda_1, \lambda_2, \lambda_3 \quad \text{[Formula 3]}$$

$\lambda_1 \approx 0$ $\lambda_2, \lambda_3 \gg 0$

Figure 8:
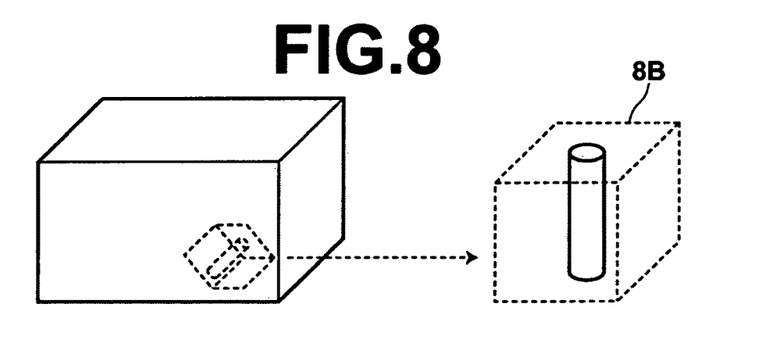

The normalization processing section 50 administers normalizing processes onto target regions that include the target tissues, based on the directions of the principal axes calculated by the principal axis direction calculating section 40 (step S4). The normalization processing section 50 cuts out normalized images along the calculated directions of the principal axes, as illustrated in FIG. 8. As indicated by element 8B, the three dimensional image of the target tissue after the normalizing process has been administered thereon is characterized by being rotationally invariant. However, the image processing apparatus need not necessarily perform the normalizing process. Alternatively, the judging section 60 may utilize the machine learning technique to obtain features for discriminating under the same conditions as that in which normalization is performed.

Next, the judging section 60 calculates the features of the normalized target regions, and judges whether true target tissues are included in the target regions, employing the calculated features (step S5).

The judging section 60 extracts the features from the target regions, on which the normalization processing section 50 has administered the normalizing processes, by the aforementioned machine learning technique or the like, and performs judgment regarding whether true target tissues are present.

In the case that a candidate target tissue is judged to be a true target tissue, the judging section 60 designates a predetermined point within the target region cut out from the image as a candidate point. Judgments are repeated while there are still remaining target regions to be judged (step S6: YES).

Note that the embodiment of the present invention is described as an example in which the target tissues are coronary arteries. However, the present invention may be utilized to extract other linear structures, such as cerebral blood vessels, hepatic blood vessels, pulmonary blood vessels, and bronchial tubes.

As described above, the image processing apparatus of the present invention calculates the directions of the principal axes of candidate target tissues formed by linear structures within the detection regions or the directions of lines normal to candidate target tissues formed by planar structures within the detection regions; administers normalizing processes onto candidate target regions that include the candidate target tissues based on the directions of the principal axes or the directions of the normal lines; calculates features of the normalized candidate target regions; and judges whether target tissues are included in the candidate target regions using the calculated features. Therefore, stable detection is enabled, even if the outer appearances of target tissues formed by linear structures are varied due to curvature, branching, or disease.

Next, when judgments regarding all target regions are completed, and judgment becomes unnecessary (step S6: NO), reconstruction is performed to connect the plurality of candidate points, employing a cost function which has as conditions that the relationship between at least two of the candidate points from among the plurality of candidate points is such that they are within a predetermined distance from each other, based on the positional information of each of the two candidate points, and that the sum of two acute angles determined by a basic line that connects the two candidate points and the directions of the principal axes of each of the two candidate points is less than a predetermined angle (step S7).

Specifically, the reconstruction processing section 70 reconstructs the set plurality of candidate points using the minimum spanning tree technique, to obtain tree structures for coronary arteries, which are target tissues. At this time, the reconstruction processing section 70 sets the cost function employing edge data among the candidate points.

Figure 9:
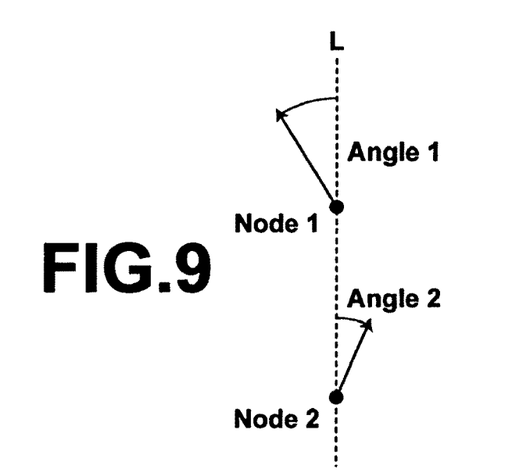
Figure 13A:
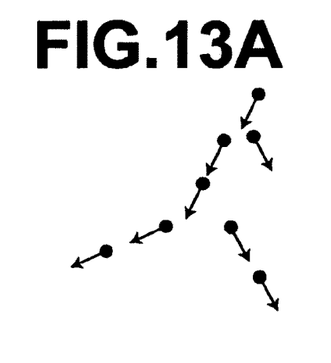
FIG. 13A A conceptual diagram for explaining reconstruction of a tree structure (prior to connection)
Figure 13B:
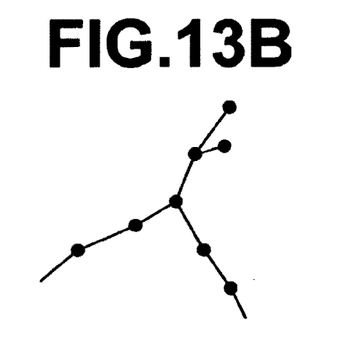
FIG. 13B A conceptual diagram for explaining reconstruction of a tree structure (following connection)

For example, the cost function sets weighting of the edge data among candidate points to be lower for candidate points which are close to each other. Further, the cost function sets the weighting of the edge data to be lower between candidate points, for which the sum (Angle 1+Angle 2) of two acute angles determined by a basic line L that connects two candidate points (Node 1, Node 2) and the directions of the principal axes of each of the two candidate points is less than a predetermined angle as illustrated in FIG. 9, the smaller the sum of the two acute angles are. By setting the cost function in this manner, the reconstruction processing section 70 enables candidate points which are in an unconnected state illustrated in FIG. 13A to be connected and reconstructed as illustrated in FIG. 13B.

Specifically, the reconstruction processing section 70 sets the cost function as shown in Formula (4).

$$1.0 - f_{distance \& radius} \times f_{direction} \times f_{shape\ of\ heart} \quad [\text{Formula 4}]$$

The cost function is set, employing the distances among candidate points, the radius of the blood vessel, the direction of the principal axis, and the CT values at the candidate points as variables.

Figure 10:
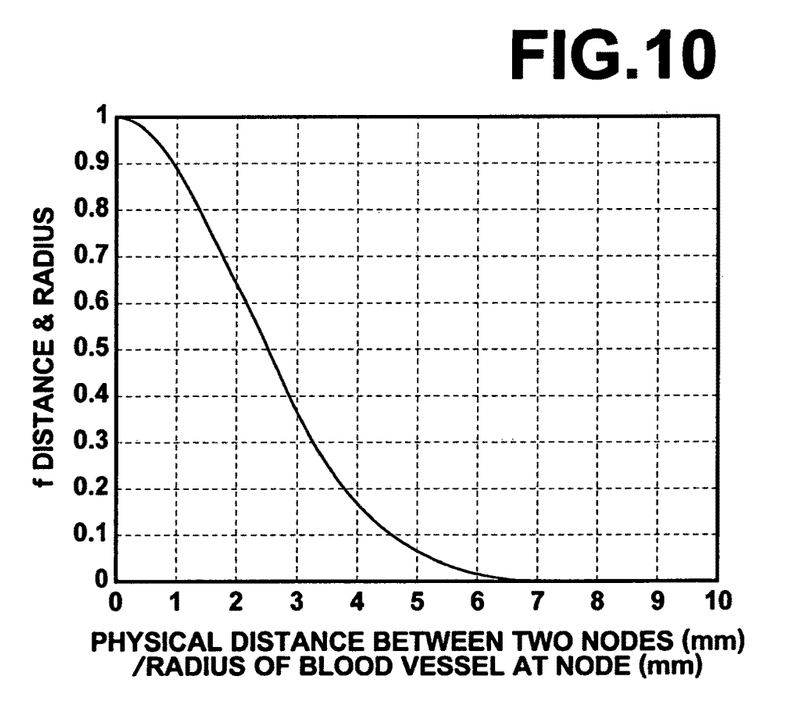

The Gaussian kernel (f) function in Formula (4) that employs the distances among candidate points and the radius of the blood vessel is a function that yields smaller outputs as the physical distances increase, and is set as illustrated in FIG. 10. The vertical axis of the graph of FIG. 10 represents the Gaussian kernel (f) function that employs the distances among candidate points and the radius of the blood vessel. The horizontal axis of the graph of FIG. 10 represents the distances between two candidate points divided by the radius of the blood vessel at the candidate points.

Alternatively, the cost function may be set such that higher outputs are obtained for thick blood vessels, even over long distances, by normalizing according to the radius of the blood vessel. The radius (thickness) of the blood vessel represents the scale of the multiple resolution image during discrimination of the candidate points. For example, the radius of the blood vessel is set to 2.0 mm for candidates which are detected within an image having voxel data resolution of 1.0 mm, and the radius of the blood vessel is set to 4.0 min for candidates which are detected within an image having voxel data resolution of 2.0 mm.

Figure 11:
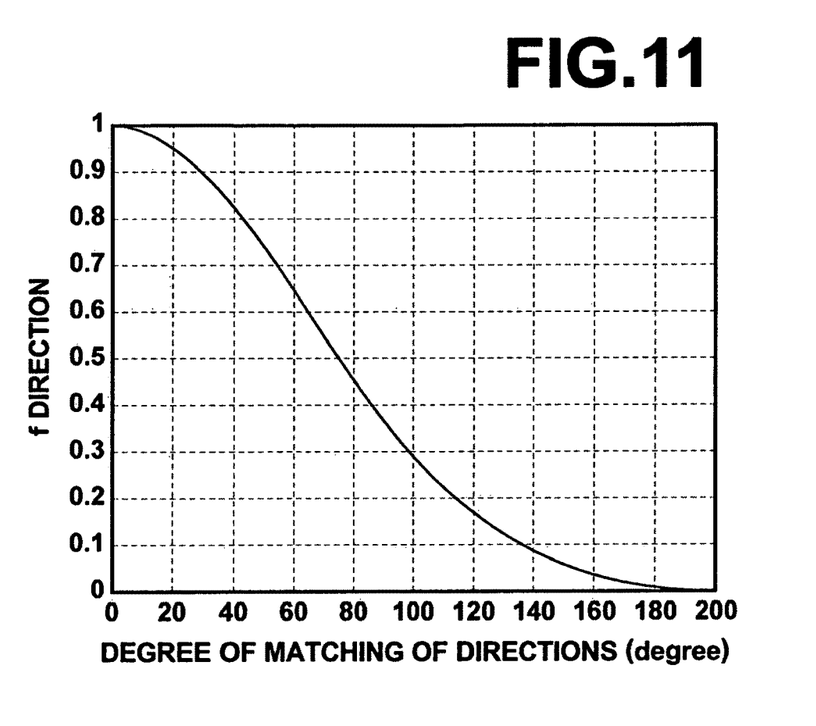
FIG. 11 A graph for explaining a cost function (angle)

The Gaussian kernel (f) function in Formula (4) that employs the direction of the principal axis is set such that the output becomes smaller as the directions (Angle 1 and Angle 2) that two candidate points (Node 1 and Node 2) point in diverge, as illustrated in FIG. 11. As described previously, the weighting of the edge data is set to be lower between candidate points, for which the sum (Angle 1+Angle 2) of two acute angles determined by a basic line L that connects two candidate points (Node 1, Node 2) and the directions of the principal axes of each of the two candidate points is less than a predetermined angle as illustrated in FIG. 9, the smaller the sum of the two acute angles are.

The degree of matching between directions becomes greater as the sum of the two acute angles is less than the predetermined angle and approaches 0 in this manner.

Note that the vertical axis of the graph of FIG. 11 represents the Gaussian kernel (f) function, and the horizontal axis represents degrees of matching between the directions of the principal axes.

Figure 14A:
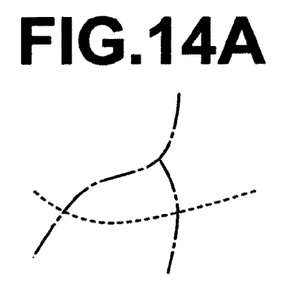
FIG. 14A A first conceptual diagram for explaining a reconstruction process for coronary arteries and veins FIG. 14B A second conceptual diagram for explaining a reconstruction process for coronary arteries and veins FIG. 14C A third conceptual diagram for explaining a reconstruction process for coronary arteries and veins FIG. 15A A first conceptual diagram for explaining how the shape of a cardiac region is expressed as a cost function FIG. 15B A second conceptual diagram for explaining how the shape of a cardiac region is expressed as a cost function FIG. 16 A graph for explaining a cost function (shape of a heart)
Figure 14B:
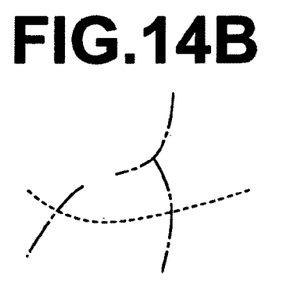
Figure 14C:
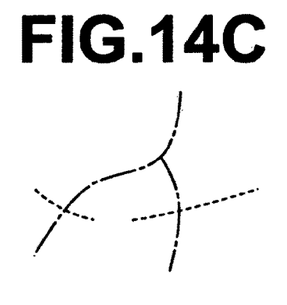

The reconstruction processing section 70 follows a basic rule that loops do not exist, because it generates tree structures by connecting candidate points according to the minimum spanning tree technique. For this reason, in the case that a vein (indicated by the dotted line) intersect with arteries (indicated by the chain lines) as illustrated in FIG. 14A, one of the points within the loop is cut off and reconstruction is performed, as illustrated in FIG. 14B. By considering CT values in the cost function, the edge which is not connected is placed along the path of the vein (indicated by the dotted line) and the paths of the arteries (indicated by the chain lines) can be correctly reconstructed, as illustrated in FIG. 14C.

Figure 12:
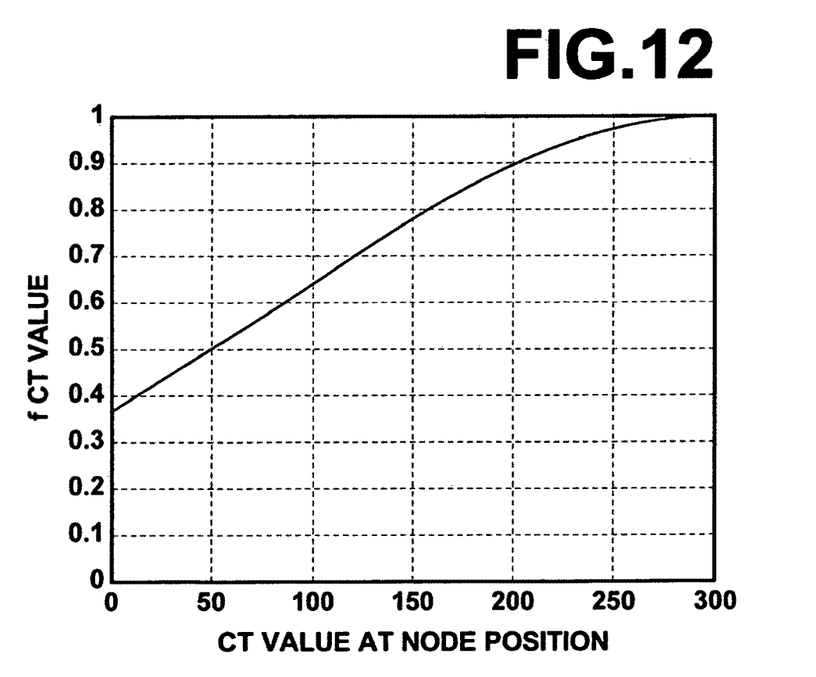
FIG. 12 A graph for explaining a cost function (CT value)

In addition, the Gaussian kernel (f) function in Formula (4) that employs the CT value is set such that the output becomes smaller as the CT values are lower at the positions of candidate points. That the CT value of coronary arteries imaged with a contrast agent is within a range from approximately 200 to 400 is employed as a standard. The vertical axis of the graph of FIG. 12 represents the Gaussian kernel (f) function that employs the CT value, and the horizontal axis represents CT values of candidate points (nodes).

Further, the cost function may be that which sets the shape of a heart as weighting.

Figure 15A:
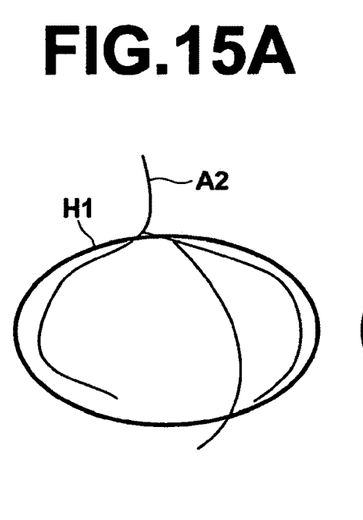
Figure 15B:
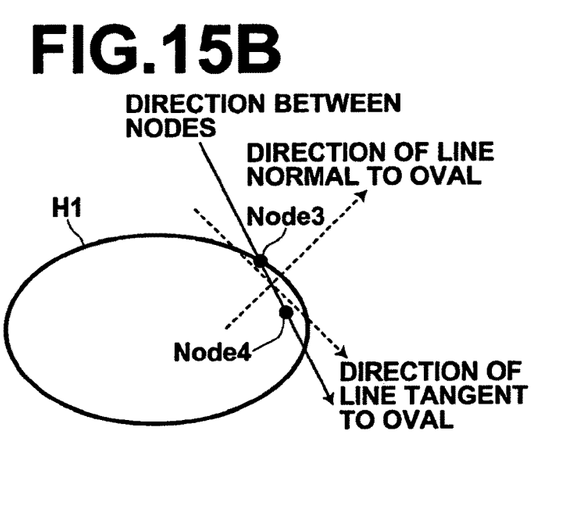
Figure 16:
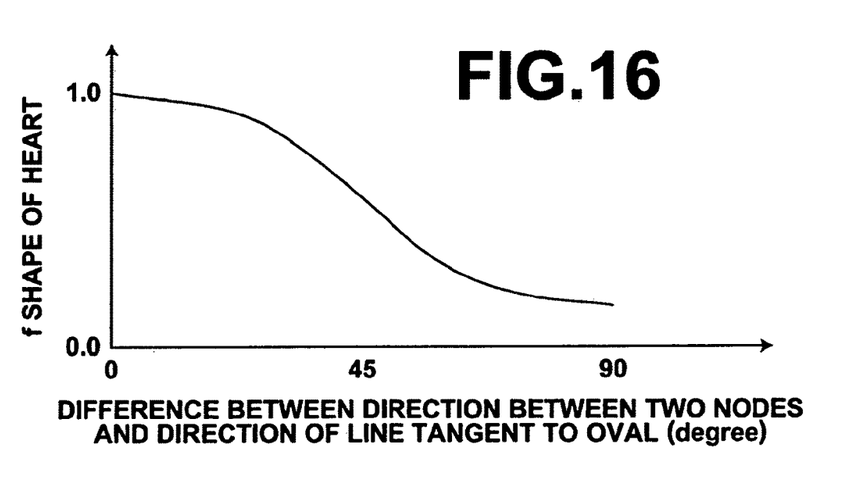

Specifically, the fact that an artery A2 exists around a substantially oval shaped heart H1 as illustrated in FIG. 15A is utilized. The method of least squares is employed to fit an oval shape to a group of points Node 3 and Node 4 (candidate points), as illustrated in FIG. 15B, and the direction in which the points are connected is calculated. The Gaussian kernel (f) function illustrated in FIG. 16 that employs the shape of the heart calculates the directions of tangent lines to an oval shape, reduces costs when the difference between the two angles are small, and sets the weighting to be smaller as the direction approaches a direction normal to the oval shape (as the difference approaches 90 degrees). The vertical axis of the graph of FIG. 16 represents the Gaussian kernel (f) function that employs the shape of the heart, and the horizontal axis represents differences between directions in which two candidate points (nodes) are connected and lines tangent to the oval shape.

Note that the Gaussian kernel (f) function may employ any the shape of any tissue, and is not limited to the shape of the heart.

In this manner, the reconstruction processing section 70 calculates whether at least two candidate points from among the detected plurality of candidate points can be connected, using the minimum spanning tree technique employing the aforementioned cost functions. In addition, the relationships of other candidate points are also calculated, to detect target tissues.

As described above, the image processing apparatus of the present invention calculates positional information and the directions of the principal axes for a plurality of candidate points that represent target tissues formed by linear structures, by administering a predetermined detecting process on three dimensional images obtained by imaging subjects; and performs a reconstruction process such that the plurality of candidate points are connected, using a cost function that employs variables based on the calculated positional information and the directions of the principal axes. Therefore, target tissues can be correctly detected without erroneous connections being generated, even if candidate points which are noise are present within the three dimensional images.

The invention claimed is:

1. An image processing apparatus, comprising:
   a detection region setting section, for setting detection regions within three dimensional images obtained by imaging subjects;
   a principal axis/normal line direction calculating section, for calculating one of the directions of the principal axes of candidate target tissues formed by linear structures within the detection regions or the directions of lines normal to candidate target tissues formed by planar structures within the detection regions;
   a normalization processing section, for administering normalizing processes which cut candidate target regions of a predetermined three dimensional shape along one of the directions of the principal axes or the directions of the normal lines, wherein each of the candidate target regions includes the candidate tissue which is scaled into a predetermined size and located along a predetermined direction; and a judging section, for calculating features of the normalized candidate target regions, and for judging whether target tissues are included in the candidate target regions using the calculated features.

2. An image processing apparatus as defined in claim 1, wherein:
the principal axis/normal line direction calculating section calculates the directions of the principal axes or the directions of the normal lines by calculating Hessian matrices with respect to the detection regions, and by analyzing eigenvalues of the calculated Hessian matrices.

3. An image processing apparatus as defined in claim 2, wherein:
the principal axis/normal line direction calculating section judges whether the candidate target tissues are formed by linear structures or formed by planar structures, based on whether the eigenvalues satisfy predetermined threshold value conditions.

4. An image processing apparatus as defined in claim 1, wherein:
the judging section is equipped with normalized data based on the directions of principal axes or normal lines of target tissues of the same types as the target tissues from three dimensional images that include the same types of target tissues which are prepared in advance as teacher data; and
the judging section judges whether the candidate target regions include the target tissues by analyzing the calculated features, utilizing a machine learning method using the teacher data.

5. An image processing apparatus as defined in claim 4, wherein:
the target tissues are coronary arteries.

6. An image processing apparatus as defined in claim 1, wherein:
the detection regions are regions that include the cardiac regions of the subjects.

7. An image processing method, comprising:
setting detection regions within three dimensional images obtained by imaging subjects;
calculating one of the directions of the principal axes of candidate target tissues formed by linear structures within the detection regions or the directions of lines normal to candidate target tissues formed by planar structures within the detection regions;
administering normalizing processes which cut candidate target regions of a predetermined three dimensional shape along one of the directions of the principal axes or the directions of the normal lines, wherein each of the candidate target regions includes the candidate tissue which is scaled into a predetermined size and located along a predetermined direction;
calculating features of the normalized candidate target regions; and
judging whether target tissues are included in the candidate target regions using the calculated features.

8. A non-transitory computer readable recording medium having a program recorded therein, the program causing a computer to realize the functions of:
setting detection regions within three dimensional images obtained by imaging subjects;
calculating one of the directions of the principal axes of candidate target tissues formed by linear structures within the detection regions or the directions of lines normal to candidate target tissues formed by planar structures within the detection regions;
administering normalizing processes which cut candidate target regions of a predetermined three dimensional shape along one of the directions of the principal axes or the directions of the normal lines, wherein each of the candidate target regions includes the candidate tissue which is scaled into a predetermined size and located along a predetermined direction;
calculating features of the normalized candidate target regions; and
judging whether target tissues are included in the candidate target regions using the calculated features.

9. An image processing apparatus as defined in claim 1, wherein:
the calculated features include primary differential values of voxel values in the X, Y and Z directions within the candidate target regions.

10. An image processing apparatus as defined in claim 9, wherein:
the calculated features further include at least one of absolute values of voxel values within the candidate target regions, histograms of voxel values within the candidate target regions, and secondary differential values of voxel values in the X, Y and Z directions within the candidate target regions.

11. An image processing apparatus as defined in claim 1, wherein:
the detection region setting section scans each voxel of the three dimensional images and sets the detection region for each of the scanned voxels.

12. An image processing apparatus as defined in claim 1, wherein:
the detection region setting section converts the three dimensional images into multiple resolutions and generates Gaussian pyramids and sets the detection regions within each generated Gaussian pyramid.

13. An image processing apparatus as defined in claim 1, wherein:
the candidate tissues are formed by linear structures,
each of the candidate target regions has a predetermined length along the direction of the principal axis of the candidate tissue, and
the predetermined length being longer than the radius of the scaled candidate tissue included in the candidate target region.

14. An image processing apparatus as defined in claim 13, wherein:
the candidate target regions are in the three dimensional shape of an approximate cube.

15. An image processing apparatus as defined in claim 5, wherein:
the normalized data include positive teacher data which represent linear portions, curved portions, branching portions and diseased portions of coronary arteries, and negative teacher data which represent portions other than coronary arteries, and
the judging section judges whether the candidate target regions include the target tissues by analyzing the calculated features, utilizing a machine learning method using the positive teacher data and the negative teacher data.

* * * * *